W. R. HOFFMANN & T. A. HILL.
STAND.
APPLICATION FILED OCT. 21, 1911.
1,181,097.
Patented Apr. 25, 1916.
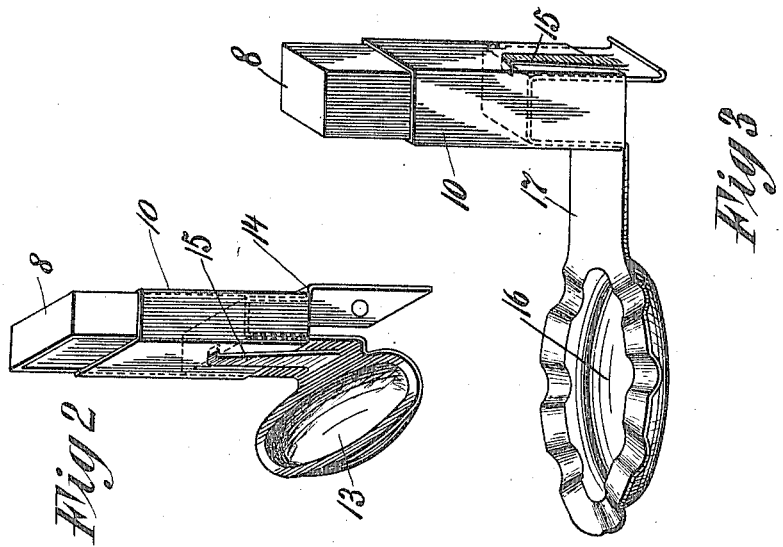
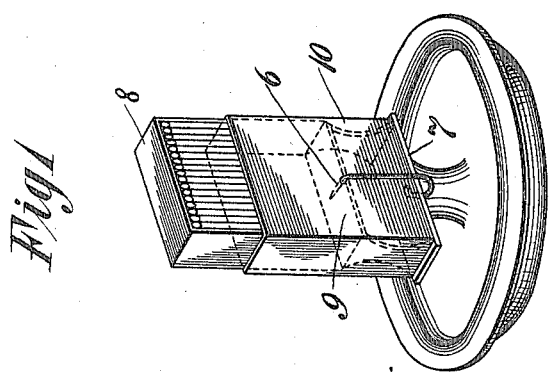
Witnesses:
Ang. T. Injansen
John T. Reilly
William R. Hoffmann
Thomas A. Hill
Inventors:
By their Attorney
Thomas A. Hill

UNITED STATES PATENT OFFICE.

WILLIAM R. HOFFMANN AND THOMAS A. HILL, OF BROOKLYN, NEW YORK; SAID HILL ASSIGNOR TO SAID HOFFMANN.

STAND.

1,181,097.　　　　Specification of Letters Patent.　　Patented Apr. 25, 1916.

Application filed October 21, 1911. Serial No. 655,943.

*To all whom it may concern:*

Be it known that we, WILLIAM R. HOFFMANN and THOMAS A. HILL, citizens of the United States, both residing in the borough of Brooklyn, in the county of Kings and State of New York, have invented certain new and useful Improvements in Stands, of which the following is a specification, reference being had therein to the accompanying drawing.

Our invention relates to improvements in receptacles and has particular reference to a receptacle adapted for holding matches, cigarettes, or the like.

Referring to the accompanying drawings, Figure 1 illustrates one form of receptacle adapted for use as a stand to be placed upon the table. Fig. 2 is a perspective view of another form adapted to be secured to a wall or partition, and Fig. 3 is another modification in perspective of the form adapted for use on the table.

The form shown in Fig. 1 is the usual match box stand with the addition of the pointed hook 6 secured to the platform 7 of the stand as shown. After the box of matches has been placed upon the stand in the usual manner as illustrated, the hook 6 which is pivotally secured to the platform 7 and drops down when not in use, is pressed through the woodwork of the box and prevents the same from being pulled off the stand when the matches are withdrawn. It will of course be understood that the sliding portion 8 of the match box may be inserted as shown so that the hook may engage the bottom 9 thereof and prevent its withdrawal or it may be inserted backward so that the point 6 penetrates through the wood of the sliding portion 8 as well as the outer portion 10.

In the modifications shown in Figs. 2 and 3 the interior receptacle is made in a single piece in each case as illustrated. In Fig. 2, the bowl, or support, 13 is preferably elongated, as shown so that when the fixture is attached to the wall it will not unduly project. The types shown in Figs. 2 and 3 are preferably stamped out of sheet metal and in Fig. 2 a ledge such as 14 is preferably formed to serve as a stop for the outer part 10 of the box. In the breast of the receptacle or support shown in Fig. 2 a hook 15 is preferably cut with a downwardly projecting point as shown so that after the box of matches or cigarettes has been placed upon the receptacle or support, the point of the hook 15 may be pressed into the same to securely hold it in position and prevent the same from being pulled off when the matches are withdrawn. In the modification shown in Fig. 3 it will be observed that this hook is preferably formed at the back of the receptacle or support and that the back of the receptacle or support projects downwardly to a level with the base of the bowl 16 thereby giving support at the back so as not to tip over the receptacle when the box of matches or cigarettes is pushed in place. The neck 17 may also be elongated as shown in Fig. 3 to allow for suitable advertising as illustrated.

Having described our invention, what we claim as new, and desire to secure by Letters Patent is:

1. In combination with a support for a box of matches, a base portion adapted to enter the outer sliding portion of said box of matches, and a tongue stamped out of said base portion adapted to extend outside of said outer sliding portion and provided with a bent-over entering point adapted to penetrate said outer and said inner sliding portions.

2. In combination with a support for a box of matches, a base adapted to enter the outer sliding portion of said box, a tongue movably secured adjacent said base and having a bent-over entering point adapted to penetrate both inner and outer portions of said box.

In testimony wherof we affix our signatures in presence of two witnesses.

WILLIAM R. HOFFMANN.
　　　　THOMAS A. HILL.

Witnesses:
　　AUG. P. JUNGERSEN,
　　THOMAS A. HILL.

Copies of this patent may be obtained for five cents each, by addressing the "Commissioner of Patents, Washington, D. C."